(12) United States Patent
Weston-Lewis

(10) Patent No.: US 12,254,530 B1
(45) Date of Patent: Mar. 18, 2025

(54) METHOD AND SYSTEM FOR GENERATING CONTEXTUAL THUMBNAIL PREVIEWS

(71) Applicant: INFOSYS LIMITED, Bangalore (IN)

(72) Inventor: Sebastian Weston-Lewis, London (GB)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 18/527,344

(22) Filed: Dec. 3, 2023

Related U.S. Application Data

(63) Continuation-in-part of application No. 18/238,466, filed on Aug. 26, 2023.

(51) Int. Cl.
 *G06F 3/048* (2013.01)
 *G06F 3/0481* (2022.01)
 *G06F 8/20* (2018.01)
 *G06T 11/00* (2006.01)

(52) U.S. Cl.
 CPC ............ *G06T 11/00* (2013.01); *G06F 3/0481* (2013.01); *G06F 8/20* (2013.01)

(58) Field of Classification Search
 CPC ........... G06F 11/00; G06F 3/0481; G06F 8/20
 See application file for complete search history.

(56) References Cited

U.S. PATENT DOCUMENTS

| | | | |
|---|---|---|---|
| 6,179,294 B1 * | 1/2001 | Turnali | A63F 1/00 273/308 |
| 2023/0342657 A1 * | 10/2023 | Patel | G06N 3/09 |

* cited by examiner

*Primary Examiner* — Loc Tran
(74) *Attorney, Agent, or Firm* — Finnegan, Henderson, Farabow, Garrett & Dunner, LLP.

(57) ABSTRACT

The disclosure relates to method and system for generating contextual thumbnail previews. The method includes extracting data associated with a project including at least one component. The data includes one or more breakpoints, and one or more locales defined for the at least one component of the project. The method further includes generating a contextual map based on the data received; generating one or more interim thumbnails based on the contextual map; mapping the one or more interim thumbnails with pre-stored thumbnails within a database through a Machine Learning (ML) model; generating a consolidated contextual map based on the contextual map and the mapping; and generating one or more final thumbnails corresponding to the contextual thumbnail previews based on the consolidated contextual map.

15 Claims, 12 Drawing Sheets

METHOD AND SYSTEM FOR GENERATING CONTEXTUAL THUMBNAIL PREVIEWS

TECHNICAL FIELD

This application is a continuation-in-part of U.S. patent application Ser. No. 18/238,466, filed on Aug. 26, 2023, and which is herein incorporated by reference.

BACKGROUND

No-Code and Low-Code software development platforms have gained immense popularity for their ability to simplify application development. Software development platforms enable individuals with varying technical backgrounds to create software without extensive coding knowledge. However, a persistent challenge in this space is providing dynamic and contextual component preview thumbnails, especially when developing responsive, adaptive, and hybrid modes and multiple locale applications. The complexity of responsive designs and adaptive designs further exacerbates this issue. While the responsive designs aim to cater to various screen sizes and orientations, adaptive design tailors the user experience to specific devices or platforms. Static thumbnails cannot adapt to these variations, making it challenging to verify and fine-tune how components will perform under these circumstances.

Multiple locales requirements introduce another layer of complexity, as developers may account for different languages, scripts, and cultural subtleties. The static thumbnails fall short in conveying multiple locales adaptations effectively. Moreover, a dynamic nature of the No-Code and Low-Code platforms means that users can make real-time changes to components, affecting layout, styling, and behavior. The generation of dynamic contextual thumbnails that accurately depict these modifications can be computationally demanding and may give rise to performance concerns. Some of existing systems provide pre-rendered thumbnails for various contexts which can be resource-intensive, and user-defined previews or interactive previews which may not fully replicate a final user experience.

The present invention is directed to overcome one or more limitations stated above or any other limitations associated with the known arts.

SUMMARY

In one embodiment, a method of generating contextual thumbnail previews is disclosed. In one example, the method may include extracting data associated with a project including at least one component. The data may include one or more breakpoints, and one or more locales defined for the at least one component of the project. The method may further include generating a contextual map based on the data received. The method may further include generating one or more interim thumbnails based on the contextual map. The method may further include mapping the one or more interim thumbnails with pre-stored thumbnails within a database through a Machine Learning (ML) model. The method may further include generating a consolidated contextual map based on the contextual map and the mapping. The method may further include generating one or more final thumbnails corresponding to the contextual thumbnail previews based on the consolidated contextual map.

In another embodiment, a system for generating contextual thumbnail previews is disclosed. In one example, the system may include a processing circuitry and a memory communicatively coupled to the processing circuitry. The memory may store processor-executable instructions, which, on execution, may cause the processing circuitry to extract data associated with a project including at least one component. The data may include one or more breakpoints, and one or more locales defined for the at least one component of the project. The processor-executable instructions, on execution, may further cause the processing circuitry to generate a contextual map based on the data received. The processor-executable instructions, on execution, may further cause the processing circuitry to generate one or more interim thumbnails based on the contextual map. The processor-executable instructions, on execution, may further cause the processing circuitry to map the one or more interim thumbnails with pre-stored thumbnails within a database through a Machine Learning (ML) model. The processor-executable instructions, on execution, may further cause the processing circuitry to generate a consolidated contextual map based on the contextual map and the mapping. The processor-executable instructions, on execution, may further cause the processing circuitry to generate one or more final thumbnails corresponding to the contextual thumbnail previews based on the consolidated contextual map.

In yet another embodiment, a non-transitory computer-readable medium storing computer-executable instructions for generating contextual thumbnail previews is disclosed. The stored instructions, when executed by a processing circuitry, may cause the processing circuitry to perform operations including extracting data associated with a project including at least one component. The data may include one or more breakpoints, and one or more locales defined for the at least one component of the project. The operations may further include generating a contextual map based on the data received. The operations may further include generating one or more interim thumbnails based on the contextual map. The operations may further include mapping the one or more interim thumbnails with pre-stored thumbnails within a database through a Machine Learning (ML) model. The operations may further include generating a consolidated contextual map based on the contextual map and the mapping. The operations may further include generating one or more final thumbnails corresponding to the contextual thumbnail previews based on the consolidated contextual map.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
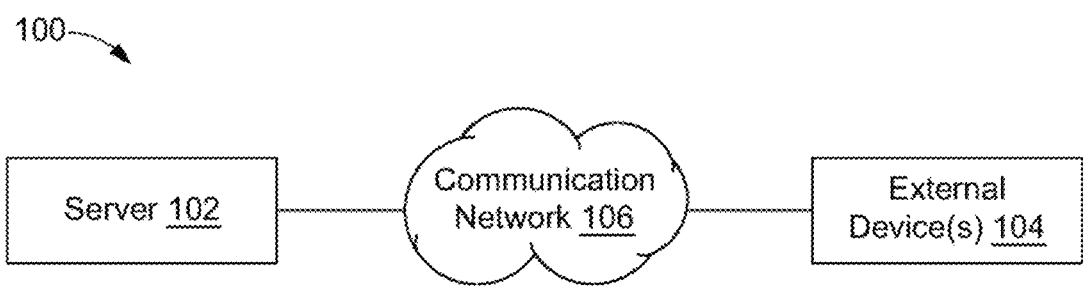
FIG. 1 illustrates a block diagram of an environment for generating contextual thumbnail previews, in accordance with an exemplary embodiment of the present disclosure.

FIG. 1 is a block diagram that illustrates an environment 100 for generating contextual thumbnail previews, in accordance with an exemplary embodiment of the present disclosure. The environment 100 may include a server 102, and a plurality of external device(s) 104. Each of the external device(s) 104 may be associated with a user/administrator. In some embodiments, the user/administrator may correspond to a developer.

The server 102 and the plurality of external device(s) 104 are configured to communicate with each other via a communication network 106 for sending and receiving various data. Examples of the communication network 106 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof.

Examples of the external device(s) 104 may include, but are not limited to a smartphone, an application server, a laptop, a desktop, a mobile phone, a smart wearable, or the like. Each of the plurality of external device(s) 104 may include a display which further includes a user interface (not shown in FIG. 1). By way of an example, the display may be used to display data (For example, data associated with a project, contextual maps, thumbnails, notifications, and the like), to the user/administrator. In some embodiments, the user/administrator may interact with the server 102 using the user interface via the communication network 106. By way of an example, the user interface of the display may be used by the user/administrator to provide inputs to the server 102. For example, the user/administrator may input a feedback to train a Machine Learning (ML) model within a memory of the server 102.

The server 102 may be configured for generating the contextual thumbnail previews dynamically. In some embodiments, the contextual thumbnail previews may also be referred to as contextual thumbnails. The contextual thumbnails are visual representations or previews of content that may be displayed in the user interface to provide users with a glimpse of what's inside or related to a particular item, link, or piece of the content. The contextual thumbnails may be used to enhance user experience by giving users an understanding of the content without having to a click on it or navigate away from a current page. The contextual thumbnails are used in various digital contexts, including but not limited to, web browsers, file managers, and content management systems.

In some embodiments, the server 102 may receive information (for example, breakpoints and locales defined for components of a project) from at least one of the external device(s) 104. Further, for generating the contextual thumbnail previews, the server 102 may perform various operations. For example, the operations may include extracting data, generating contextual maps, generating thumbnails, mapping the thumbnails, determining similarity scores, assigning categories, transmitting notifications, identifying changes in the contextual maps, updating the contextual thumbnail previews, and the like. Moreover, functionalities of the server 102 are further explained in detail in conjunction with FIG. 2.

Figure 2:
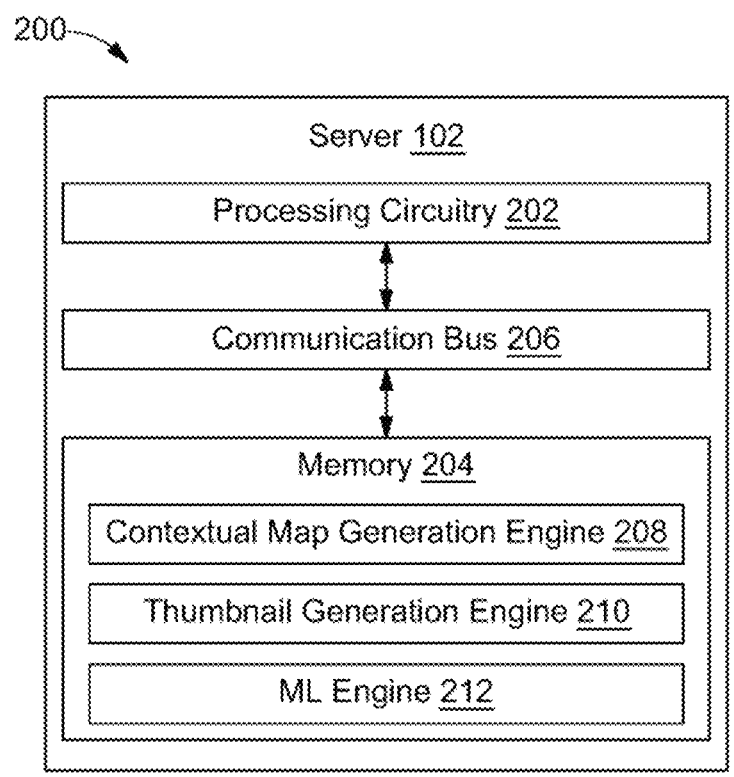
FIG. 2 illustrates a block diagram of various engines within a memory of a server configured for generating contextual thumbnail previews, in accordance with some embodiments of the present disclosure.

FIG. 2 is a block diagram of various engines within the server 102 configured for generating contextual thumbnail previews, in accordance with an exemplary embodiment of the present disclosure. FIG. 2 is explained in conjunction with FIG. 1. The server 102 may provide dynamic contextual previews that accurately reflect end-user experiences. The server 102 may consider various factors such as screen size, device capabilities, and language settings. The server 102 may render the contextual thumbnail previews on the fly based on chosen parameters (for example, breakpoints and locales). This means that users may be able to see how components of a project may look and behave on various devices, screen orientations, and in different locales. Further, the server 102 may not only render visuals but also simulate behavior of the components, in response to context changes. For example, the users may be able to instantly preview how a button's position or behavior adjusts when switching between mobile and desktop views.

The server 102 may include a processing circuitry 202, and a memory 204 communicatively coupled to the processing circuitry 202 via a communication bus 206. The memory 204 may store various data that may be captured, processed, and/or required by the server 102. The memory 204 may be a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random Access Memory (DRAM), Static Random-Access memory (SRAM), etc.)

The memory 204 may also store processor-executable instructions. The processor-executable instructions, when executed by the processing circuitry 202, may cause the processing circuitry 202 to implement one or more embodiments of the present disclosure such as, but not limited to, extracting data, generating contextual maps, generating thumbnails, mapping the thumbnails, determining similarity scores, assigning categories, transmitting notifications, identifying changes in the contextual maps, updating the contextual thumbnail previews, and the like. The memory 204 may include a contextual map generation engine 208, a thumbnail generation engine 210, and a Machine Learning (ML) engine 212. The memory 204 may also include one or more data stores (not shown in FIG. 2) for storing data and intermediate results generated by the engines 208-212. It should be noted that the modules 208-212 in conjunction with the processing circuitry 202 may perform various operations to generate contextual thumbnail previews.

In some embodiments, the contextual map generation engine 208 may extract data associated with a project. For example, here, the project may correspond to a page associated with an application. The application may correspond to a web application or a website, a mobile application, or a web page. The application may also be referred to as an application program or an application software. Examples of the application may include, but are not limited to, a shopping application, a gaming application, a social media application, an entertainment application, or the like. Further, the project may include one or more components. In one example, the one or more components may include an image, a banner, a header, a footer, simulation preferences, and the like. Further, the data extracted may include parameters such as one or more breakpoints, and one or more locales defined for the one or more components of the project.

The one or more breakpoints may be referred to screen widths at which layout and design of the application are adjusted to provide an optimal user experience on different devices. Examples of the one or more breakpoints may include, but are not limited to, '320' pixels (for example, for mobile phones), '768' pixels (for example, for tablets), and '1024' pixels (for example, for desktops), and '1200' pixels (for example, for large desktop monitors). It should be noted that each of the one or more locales may include at least one of a geography, and a language. Additionally, in some embodiments, the one or more locales may include a currency. The one or more locales may be extracted from a hyper-localization database. For example, one locale may have the geography as "United Kingdom", the language as "English", and the currency as "Great Britain Pound (GBP)" and another locale may have the geography as "Brazil", the language as "English" and the currency as United States Dollar (USD).

By way of an example, a developer may need to design a web page for a shopping website, such as a product catalog page or a checkout page. In this scenario, the developer may want to have visual previews of how the web page may appear in different settings. This includes the ability to see thumbnail previews that accurately represent the look and feel of the web page. To achieve this, the developer may further provide specific breakpoints and locales for various components of the web page. The components include a search bar, a promotional banner, a customer support option, a reviews and ratings option, recently viewed items, product sorting option, size options, 'Add to Cart' button, and the like. To generate thumbnail previews that accurately reflect the web page's appearance, the developer may be allowed to specify data related to the components. For instance, the developer may provide particular breakpoints, which indicate different screen widths at which a layout and a design of the page are adjusted to provide the user experience on different devices. In one example, the breakpoint may be '320 pixels,' which is a screen width for mobile devices. Additionally, the developer may provide specific locales, such as 'English-United States,' to ensure that the content and language settings are appropriate for target audience. By extracting and utilizing this data, including the breakpoints and locales, the thumbnail previews of the web page may be generated, allowing the developer to see precisely how the web page may appear to users in different contexts.

By way of another example, in context of a responsive web design, where a single website adapts to various screen sizes and devices, the project may be an entire website. Further, in such a case, the components may include a site's header, a navigation menu, content sections, contact forms, and the like. Breakpoints may represent specific screen widths where a layout changes to accommodate different devices. For instance, when designing a responsive e-commerce website, data such as locale and breakpoints at which the layout shifts from a multi-column design on desktop to a single-column layout on mobile devices, about the header, navigation menu, and product listings, may be extracted.

In detail, a user may open the project, which may be a product catalog page of the e-commerce website. The product catalog page includes several components, such as product listings, a search bar, sorting options, a breakpoint selection option and a language/locale selector. The user may select a specific breakpoint, which represents the screen width at which the layout and design of the page may be adjusted. For example, the user may choose '768 pixels,' which is associated with tablet-sized devices. Also, the user may choose 'French-France' as the locale. This data (i.e., '768 pixels' and 'French-France') may be extracted to generate a thumbnail preview of the product catalog page with the chosen settings. In this preview, the user may see the product listings displayed in a grid view, and in a French language.

Further, the contextual map generation engine 208 may generate a contextual map based on the data received. Structure of the contextual map may be in a form of matrix that includes various rows and columns. For example, the contextual map may include four locales and four breakpoints. The rows may include locales (such as locale 1 (EN_US), locale 2 (ES_US), locale 3 (JP_JP), locale 4 (AR_SA)), and the columns may include breakpoints (such as 320-767 pixels, 768-1023 pixels, 1024-1199 pixels, and 1200-1600 pixels). An example representation of the contextual map may be further illustrated in conjunction with FIGS. 5A-5B. The contextual map generation engine 208 may be communicatively coupled to the thumbnail generation engine 210, and the ML engine 212.

The thumbnail generation engine 210 may generate one or more interim thumbnails based on the contextual map. The one or more interim thumbnails may be referred to temporary or placeholder thumbnails. The one or more interim thumbnails are small images or graphics that are used as a stand-in for final thumbnails. The one or more interim thumbnails serve as a visual representation until final thumbnails are created or selected. The one or more interim thumbnails may be stored in a temporary database and removed after generation of the final thumbnails. The thumbnail generation engine 210 may be operatively coupled to the ML engine 212.

The ML engine 212 may map the one or more interim thumbnails with pre-stored thumbnails within a database (such as thumbnail database). In particular, the ML engine may use ML model for mapping. The database may include a collection of the pre-existing thumbnails (i.e., the pre-stored thumbnails). The pre-existing thumbnails may be already known, labeled, or categorized. The database may serve as a reference for matching the one or more interim thumbnails. The ML model may find similarities or associations between the one or more interim thumbnails and the pre-stored thumbnails. Examples of the ML model may include, but are not limited to, Convolutional Neural Networks (CNNs), Siamese networks, Autoencoders, object detection models, Generative Adversarial Networks (GANs), Recurrent Neural Networks (RNNs), transfer learning models, feature matching models, and the like. For example, if an interim thumbnail is an image including a red car, the ML model may find pre-stored thumbnails of other red cars in the database.

In some embodiments, the ML engine 212 may determine a similarity score for each of the one or more interim thumbnails based on the mapping. Further, the ML engine 212 may assign a category from a plurality of pre-defined categories to the each of the one or more interim thumbnails, based on the similarity score and a pre-defined tolerance. The plurality of categories may include an identical-match category, a similar match category, and a non-match category. In some embodiments, the ML engine 212 may transmit a notification to a user, upon failure in assigning the category from the plurality of pre-defined categories. In such a case, the ML engine 212 may receive a feedback from the user, in response to the notification. Subsequently, the ML model may be trained based on the feedback received from the user, through a feedback mechanism.

Furthermore, the contextual map generation engine 208 may generate a consolidated contextual map based on the contextual map and the mapping through a deterministic algorithm. It should be noted that the contextual map and the consolidated contextual map may correspond to a matrix that includes a plurality of cells. Each of the plurality of cells may represent a thumbnail. Also, it should be noted that cells corresponding to thumbnails with the identical-match category, or the similar-match category may be consolidated to generate the contextual thumbnail previews, and cells corresponding to thumbnails with the non-match category may be retained.

Once the consolidated contextual map is generated, the thumbnail generation engine 210 may generate one or more final thumbnails corresponding to the contextual thumbnail previews based on the consolidated contextual map. In some embodiments, the contextual map may be updated when a change in the contextual map may be identified. A type of the change may be at least one of a structural change, a metadata change, and a data change. The contextual thumbnail previews may be updated upon a successful identification of the change.

It should be noted that all such aforementioned engines 208-212 may be represented as a single module or a combination of different modules. Further, as will be appreciated by those skilled in the art, each of the engines 208-212 may reside, in whole or in parts, on one device or multiple devices in communication with each other. In some embodiments, each of the engines 208-212 may be implemented as dedicated hardware circuit comprising custom application-specific integrated circuit (ASIC) or gate arrays, off-the-shelf semiconductors such as logic chips, transistors, or other discrete components. Each of the engines 208-212 may also be implemented in a programmable hardware device such as a field programmable gate array (FPGA), programmable array logic, programmable logic device, and so forth. Alternatively, each of the engines 208-212 may be implemented in software for execution by various types of processors (e.g., the processing circuitry 202). An identified module of executable code may, for instance, include one or more physical or logical blocks of computer instructions, which may, for instance, be organized as an object, procedure, function, or other construct. Nevertheless, the executables of an identified module or component need not be physically located together but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for dynamically generating contextual thumbnail previews. For example, the exemplary server 102 may generate the contextual thumbnail previews by the processes discussed herein. In particular, as will be appreciated by those of ordinary skill in the art, control logic and/or automated routines for performing the techniques and steps described herein may be implemented by the server 102 either by hardware, software, or combinations of hardware and software. For example, suitable code may be accessed and executed by the one or more processors (for example, the processing circuitry 202) on the server 102 to perform some or all of the techniques described herein. Similarly, application specific integrated circuits (ASICs) configured to perform some or all of the processes described herein may be included in the one or more processors on the server 102.

Figure 3:
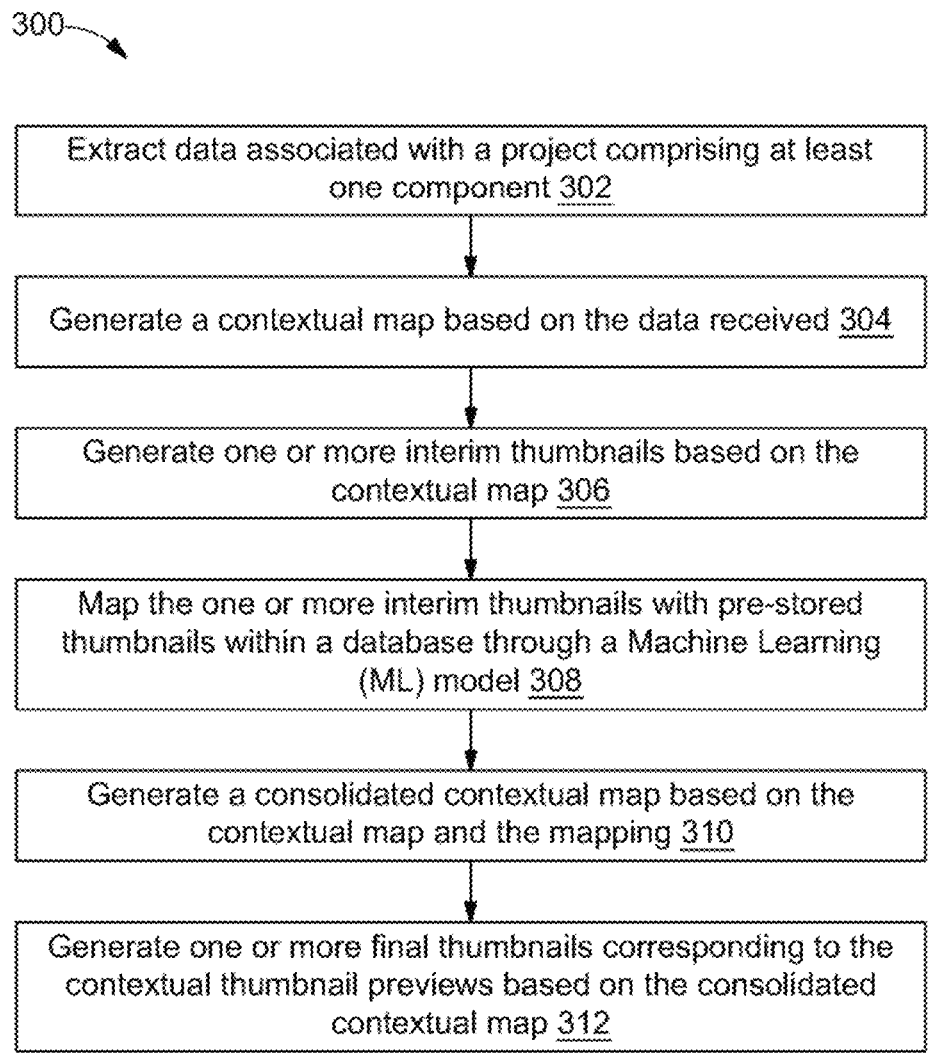
FIG. 3 illustrates a flow diagram of an exemplary method for generating contextual thumbnail previews, in accordance with some embodiments of the present disclosure.

FIG. 3 is a flow diagram that depicts an exemplary method 300 for generating contextual thumbnail previews, in accordance with an exemplary embodiment of the present disclosure. Each step of the flowchart may be executed by a server (such as the server 102). FIG. 3 is explained in conjunction with FIGS. 1-2.

At step 302, data associated with a project may be extracted through a contextual map generation engine (such as the contextual map generation engine 208). The project may include one or more components. For example, the project may correspond to a page associated with an application. The application may correspond to a web application or a website, a mobile application, or a web page. The application may also be referred to as an application program or an application software. Examples of the application may include, but is not limited to, a shopping application, a gaming application, a social media application, an entertainment application, or the like. In one example, the one or more components may include a banner, a header, a footer, simulation preferences, and the like. The data may include one or more breakpoints, and one or more locales defined for the one or more components of the project. The one or more breakpoints may be referred to screen widths at which layout and design of the page or the application are adjusted to provide an optimal user experience on different devices.

Examples of the one or more breakpoints may include, but are not limited to, '320' pixels (for example, for mobile phones), '768' pixels (for example, for tablets), and '1024' pixels (for example, for desktops), and '1200' pixels (for example, for large desktop monitors). It should be noted that each of the one or more locales may include at least one of a geography, and a language. Additionally, in some embodiments, the one or more locales may include a currency. The one or more locales may be extracted from a hyper-localization database. For example, one locale may have the geography as "United Kingdom", the language as "English", and the currency as "Great Britain Pound (GBP)" and another locale may have the geography as "Brazil", the language as "English" and the currency as United States Dollar (USD).

At step 304, a contextual map may be generated based on the data received through the contextual map generation engine. Structure of the contextual map may be in a form of matrix that includes various rows and columns. For example, the contextual map may include four locales and four breakpoints. The rows may include locales (such as locale 1 (EN_US), locale 2 (ES_US), locale 3 (JP_JP), locale 4 (AR_SA)), and the columns may include breakpoints (such as 320-767 pixels, 768-1023 pixels, 1024-1199 pixels, and 1200-1600 pixels). Here, for brevity, few examples of locales and breakpoints are explained, however there may be other examples that may be applicable.

Thereafter, at step 306, one or more interim thumbnails may be generated based on the contextual map through a thumbnail generation engine (such as the thumbnail generation engine 210). The one or more interim thumbnails may be referred to temporary or placeholder thumbnails. The one or more interim thumbnails are small images or graphics that are used as a stand-in for final thumbnails. The one or more interim thumbnails serve as a visual representation until final thumbnails are created or selected. The one or more interim thumbnails may be stored in a temporary database and removed after generation of the final thumbnails.

At step 308, the one or more interim thumbnails may be mapped with pre-stored thumbnails within a database (for example, a thumbnail database) through a Machine Learning (ML) model of an ML engine (such as the ML engine 212). The database may include a collection of the pre-existing thumbnails. The pre-existing thumbnails may be already known, labeled, or categorized. The database may serve as a reference for matching the one or more interim thumbnails. The ML model may be used to find similarities or associations between the one or more interim thumbnails and the pre-stored thumbnails. Examples of the ML model may include, but are not limited to, Convolutional Neural Networks (CNNs), Siamese networks, Autoencoders, object detection models, Generative Adversarial Networks (GANs), Recurrent Neural Networks (RNNs), transfer learning models, feature matching models, and the like.

At step 310, a consolidated contextual map may be generated based on the contextual map and the mapping through the contextual map generation engine. It should be noted that the contextual map and the consolidated contextual map may correspond to a matrix that includes a plurality of cells. Each of the plurality of cells may correspond to a thumbnail. Also, it should be noted that cells corresponding to thumbnails with identical-match category, or similar-match category may be consolidated to generate the contextual thumbnail previews, and cells corresponding to thumbnails with non-match category may be retained.

At step 312, one or more final thumbnails corresponding to the contextual thumbnail previews may be generated based on the consolidated contextual map through the thumbnail generation engine. Further, in some embodiments, a change in the contextual map may be identified. A type of the change may be at least one of a structural change, a metadata change, and a data change. The contextual thumbnail previews may be updated upon a successful identification of the change. The updating of the contextual maps is further explained in detail in conjunction with FIGS. 6A-6C.

Figure 4:
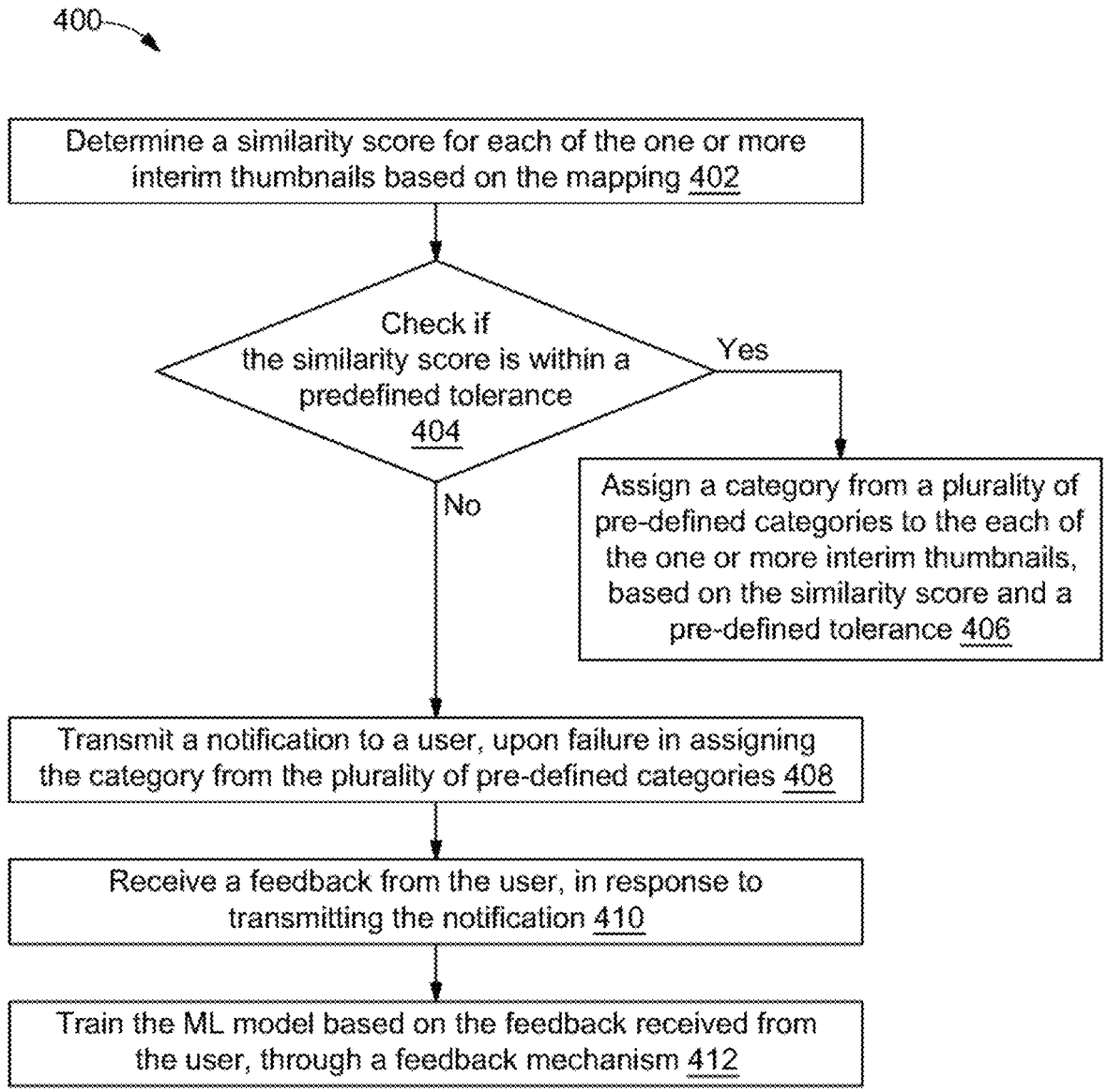
FIG. 4 illustrates a flow diagram of an exemplary method for assigning categories to interim thumbnails, in accordance with some embodiments of the present disclosure.

FIG. 4 is a flowchart that depicts a method 400 of mapping the one or more interim thumbnails with the pre-stored thumbnails, in accordance with an exemplary embodiment of the present disclosure. FIG. 4 is explained in conjunction with FIGS. 1-3. Each step of the flowchart is executed by an ML engine (such as the ML engine 212).

At step 402, a similarity score may be determined for each of the one or more interim thumbnails based on the mapping. Further, at step 404, a condition whether the similarity score is within a predefined tolerance may be checked. In case the condition checked is true, a category from a plurality of pre-defined categories may be assigned to the each of the one or more interim thumbnails, based on the similarity score and the pre-defined tolerance, at step 406. The plurality of categories may include an identical-match category, a similar match category, and a non-match category.

Alternatively, when the condition checked is found false, at step 408, a notification of failure in assigning the category from the plurality of pre-defined categories may be sent to a user. Thereafter, at step 410, a feedback may be received from the user in response to transmitting the notification. At step 412, the ML model may be trained based on the feedback received from the user, through a feedback mechanism.

Figure 5A:
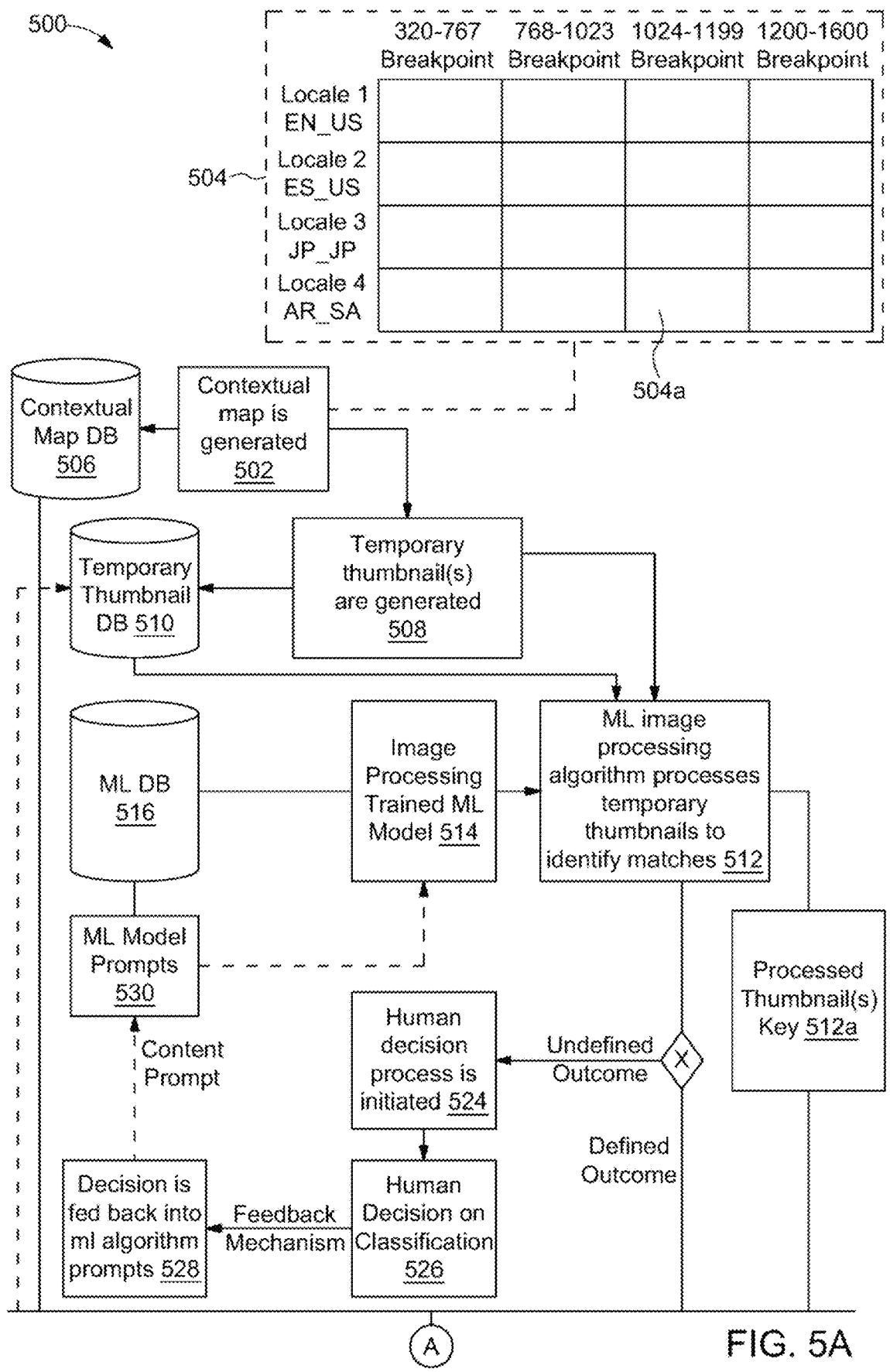
FIGS. 5A-5B illustrate a control logic for generating contextual thumbnail previews, in accordance with some embodiments of the present disclosure.
Figure 5B:
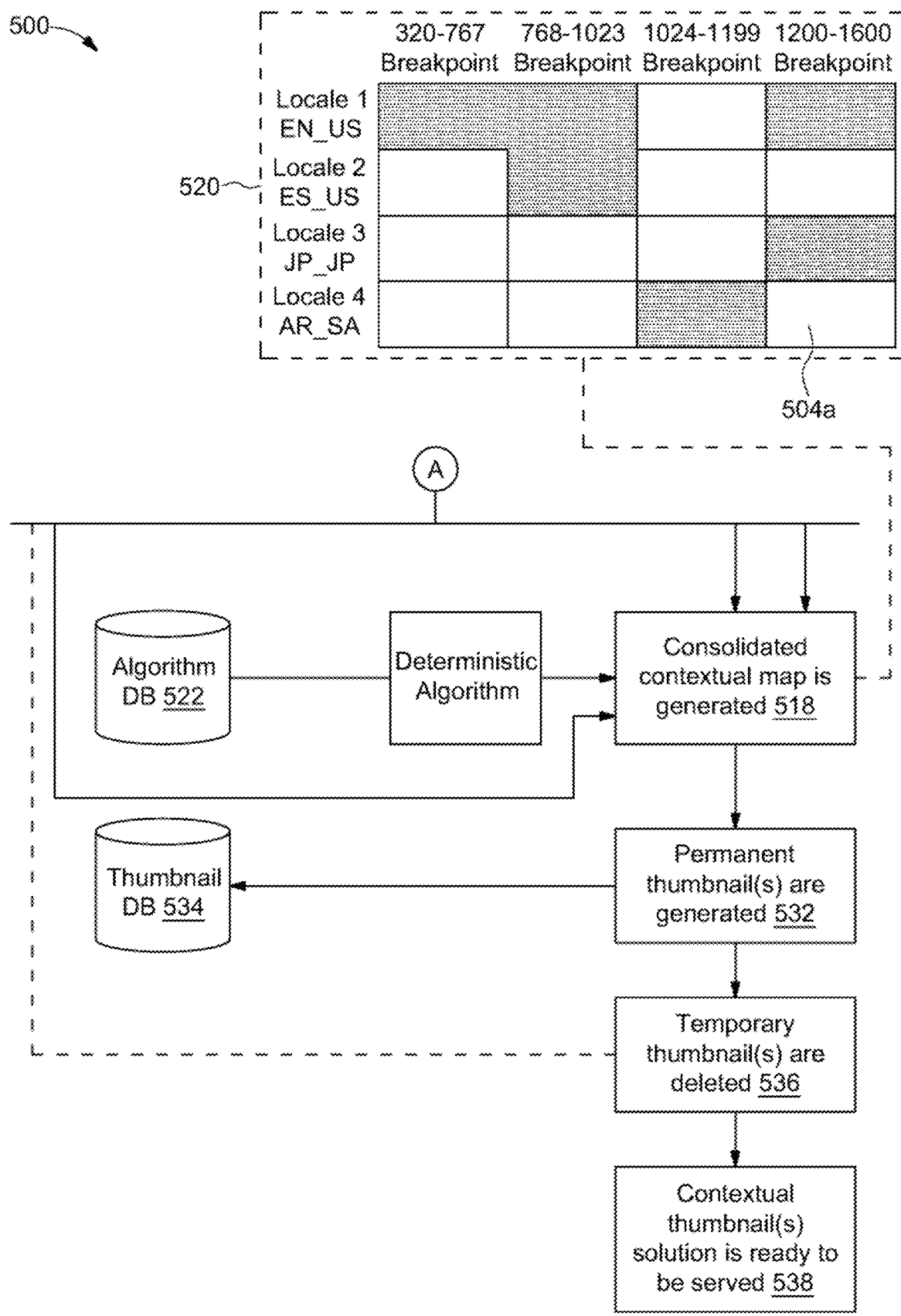

FIGS. 5A-5B illustrate a control logic 500 for generating contextual thumbnail previews, in accordance with an exemplary embodiment of the present disclosure. FIGS. 5A-5B are explained in conjunction with FIGS. 1-4.

At step 502, a contextual map 504 may be generated for a project. The contextual map 504 corresponds to a matrix that includes breakpoints (defined in the project) in columns and an locales (defined in the project and its components) in rows. As illustrated in FIG. 5A, the contextual map 504 includes four columns and four rows. The four columns correspond to breakpoints 320-765 pixels, 768-1023 pixels, 1024-1199 pixels, 1200-1600 pixels, respectively. The four rows correspond to locale 1 (EN_US), locale 2 (ES_US), locale 3 (JP_JP), and locale 4 (AR_SA). The contextual map 504 further includes various cells 504a. Once the contextual map 504 is generated, the contextual map 504 may be stored in a contextual map database (DB) 506.

Further, at step 508, temporary thumbnails (of medium quality image file) may be generated. The temporary thumbnails may be referred to as the one or more temporary thumbnails, in some embodiments of the present disclosure. The temporary thumbnails may be stored in a temporary thumbnail DB 510. At step 512, the temporary thumbnails may be processed to identify matches through an ML model (i.e., the image processing trained ML model 514) within an ML DB 516. The ML model may assign a category to each of the temporary thumbnails from a plurality of predefined categories. The plurality of predefined categories may include an identical-match category, a similar match category, and a non-match category. The identical-match category, the similar match category, and the non-match category may correspond to a thumbnail match outcome, a thumbnail near match outcome (for example, 90% match), and a thumbnail do not match outcome, respectively. Referring now to FIG. 5B, at step 518, a consolidated map 520 may be generated based on matches and processed thumbnail(s) key 512a, when the outcome is defined outcome and falls in one the plurality of predefined categories. In the consolidated map 520, cells corresponding to thumbnails with the identical-match category/thumbnail match outcome, or the similar-match category/thumbnail near match outcome may be consolidated, and cells corresponding to thumbnails with the non-match category/thumbnail do not match outcome may be retained. The consolidated map 520 may be generated through a deterministic algorithm stored in an algorithm DB 522.

As illustrated in FIG. 5A, alternatively, if the outcome is undefined and does not fall in any of the plurality of pre-defined categories, a notification may be transmitted to a user/administrator. In other words, upon failure in assigning the category from the plurality of pre-defined categories, the user may be notified. Further, at step 524, a human decision process may be initiated where a human decision on classification 526 may be considered. Subsequently, at step 528, human decision on classification 526 may be fed back to the ML model (i.e., the image processing trained ML model 514) in a form of ML model prompts 530 or content prompts.

Referring again to FIG. 5B, at step 532, permanent thumbnails (i.e., the final thumbnails) of optimized resolution image may be generated. The permanent thumbnails may be stored in a thumbnail DB 534. Once the permanent thumbnails are generated and stored, at step 536, the temporary thumbnails may be deleted from the temporary thumbnail DB 510. Further, at step 538, the contextual thumbnail(s) solution may be ready to be served.

Figure 6A:
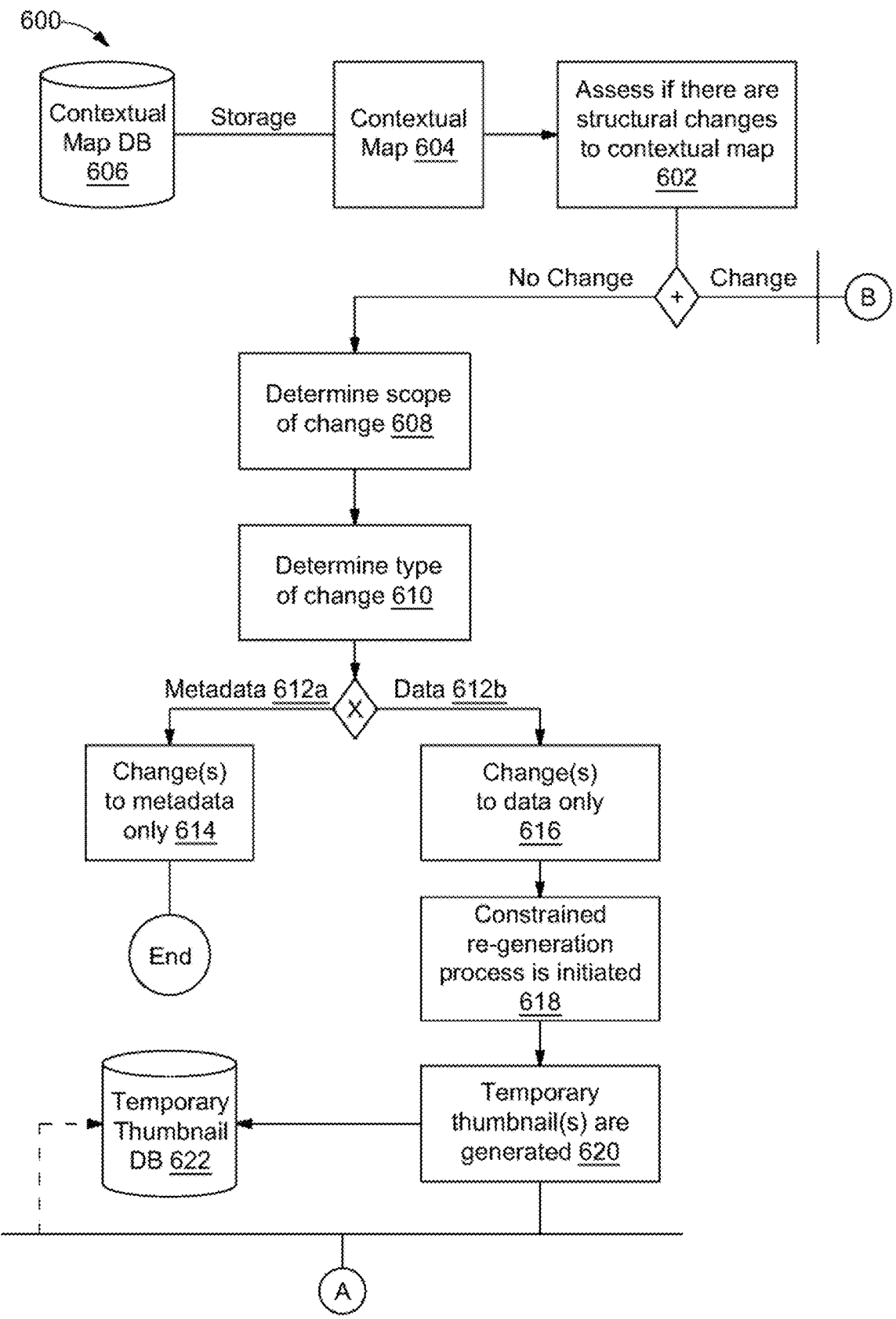
FIGS. 6A-6C illustrate a control logic for updating contextual thumbnail previews, in accordance with some embodiments of the present disclosure.
Figure 6B:
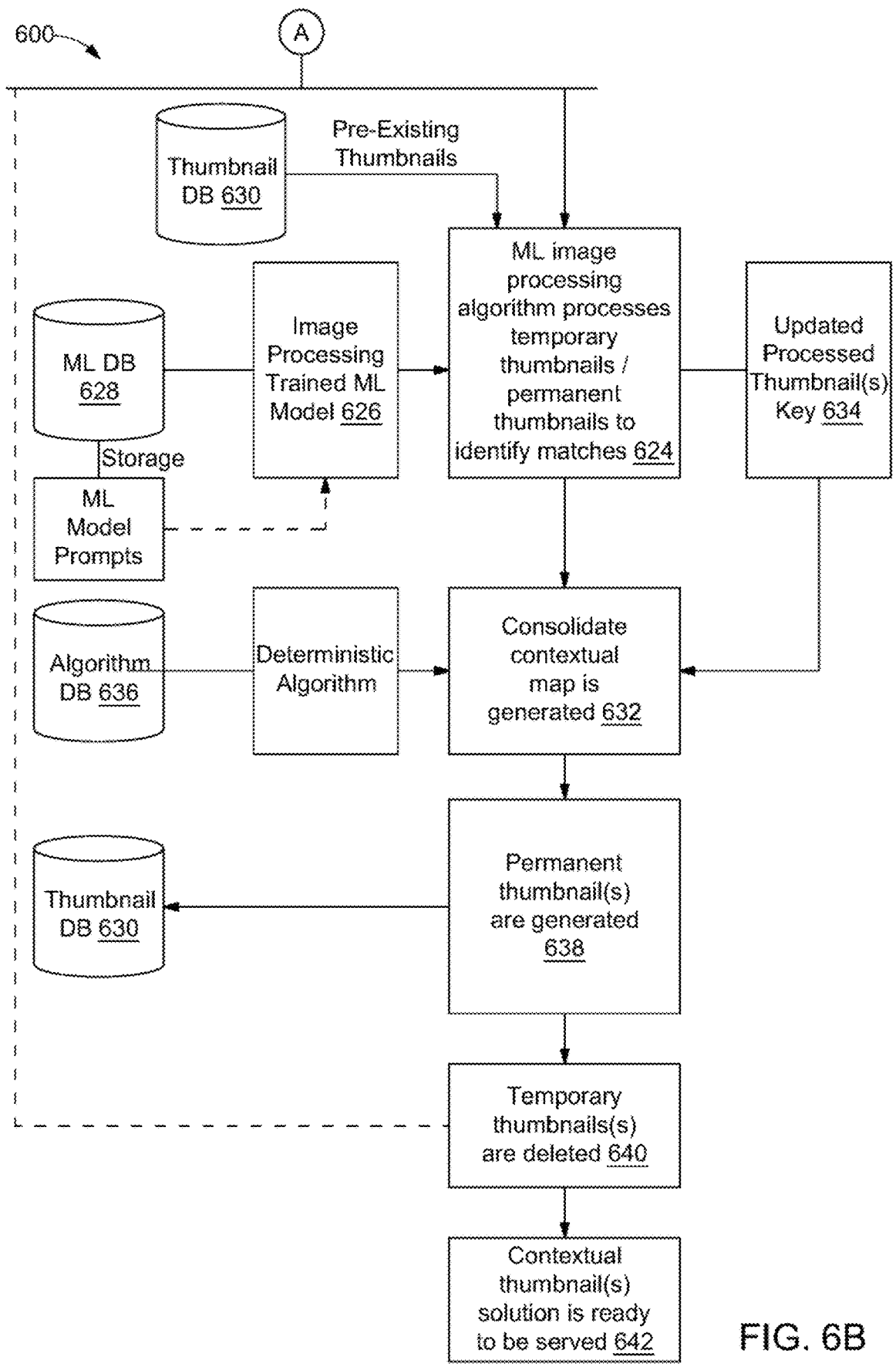
Figure 6C:
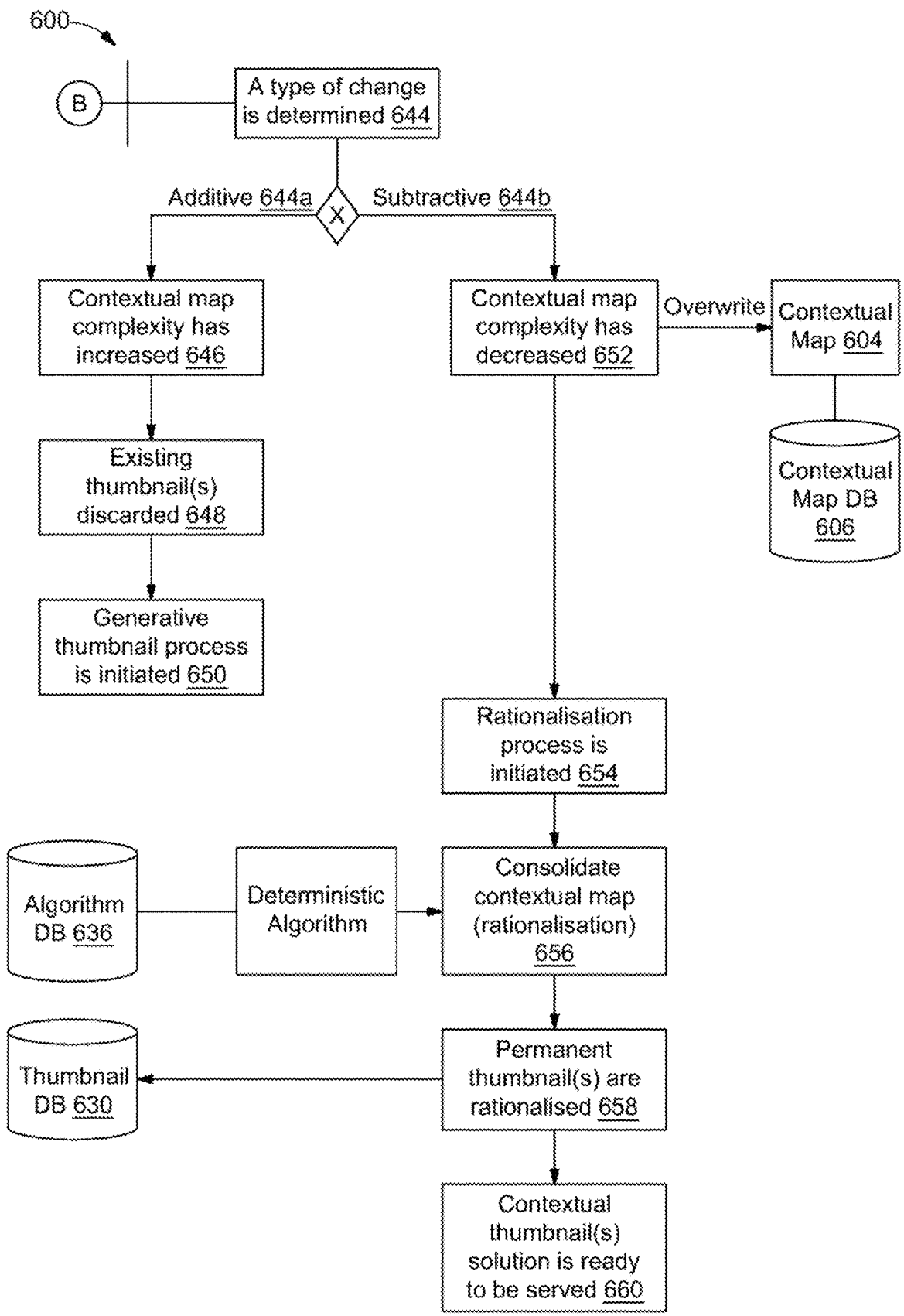

FIGS. 6A-6C illustrate a control logic 600 for updating the contextual thumbnail previews, in accordance with an exemplary embodiment of the present disclosure. FIGS. 6A-6C are explained in conjunction with FIGS. 1-5A-5B. As illustrated in FIG. 6A, at step 602, it may be assessed if there are any structural changes to a contextual map 604 (for example, the contextual map 504). In order to check this, the contextual map 604 may be extracted from a contextual map DB 606 (same as the contextual map DB 506). Further, it may be checked if there are some basic changes in the contextual map 604 (i.e., if the breakpoints or locales have changed). For example, if new a locale has been added or removed, this may be considered as the change in the contextual map 606.

Further, if there is no change (i.e., structural change), at step 608, a scope of the change may be determined. Further, at step 610, a type of change may be determined. For example, in this case, the type of change may be one of a change metadata 612a or a change in data 612b. In case of the change in metadata 612a, at step 614, changes to metadata only may be performed and the process may end. Alternatively, in case of change in the data 612b, at step 616, changes to data may only be performed. At step 618, a constrained regeneration process may be initiated. Further, at step 620, temporary thumbnails may be generated and stored in a temporary thumbnail DB 622 (such as the temporary thumbnail DB 510).

Referring now to FIG. 6B, after generation of the temporary thumbnails, at step 624, the temporary/permanent thumbnails may be processed to identify matches through an ML model (i.e., the image processing trained ML model 626) within an ML DB 628. For matching, pre-existing thumbnails from a thumbnail DB 630 (for example, the thumbnail DB 534) may also be considered. It should be noted that possible outcomes of the matching may include, but are not limited to, thumbnail match outcome, thumbnail near match outcome (i.e., with tolerance of 90%), and thumbnail do not match outcome. Further, at step 632, a consolidated contextual map may be generated based on the matching and an updated processed thumbnail key 636. The consolidated contextual map may be generated through a deterministic algorithm stored in an algorithm DB 636. Possible outcomes of the consolidated contextual map may include matrix cells where the thumbnails match may be consolidated (these may include adjacent or non-adjacent cells) and matrix cells where the thumbnails do not match may be retained as it is. Thereafter, at step 638, permanent thumbnails may be generated and stored in the thumbnail DB 630. It should be noted that step 638 may be constrained only to scoped items. Also, it should be noted that the permanent thumbnails may have an optimized resolution image. Furthermore, at step 640, the temporary thumbnails may be deleted from the temporary thumbnail DB 622. At step 642, a contextual thumbnail solution may be ready to be served.

Referring now to FIG. 6C, if there is change (i.e., structural change) in the contextual map 604, at step 644, a type of change may be determined. When the type of change is additive 644a, at step 646, it may be determined that complexity of contextual map 604 may be increased. For example, locale or breakpoints may be added to the contextual map 604. In such a case, at step 648, existing thumbnails may be discarded. Further, at step 650, generative thumbnail process may be initiated. When the type of change is subtractive 644b, at step 652, it may be determined that complexity of contextual map 604 may be decreased. In such a case, for example, a breakpoint or a may be removed from the contextual map 604. This may be overwritten in the contextual map 604 and stored the contextual map DB 606. Further, at step 654, a rationalization process may be initiated. At step 656, a deterministic algorithm from the algorithm DB 636 may consolidate the contextual map 604. Thereafter, at step 658, the permanent thumbnails may be rationalized and stored in the thumbnail DB 630. Possible outcomes in this case may include thumbnail retained and thumbnail deleted. Further, at step 660, a contextual thumbnail solution may be ready to be served and the process may end.

Figure 7A:
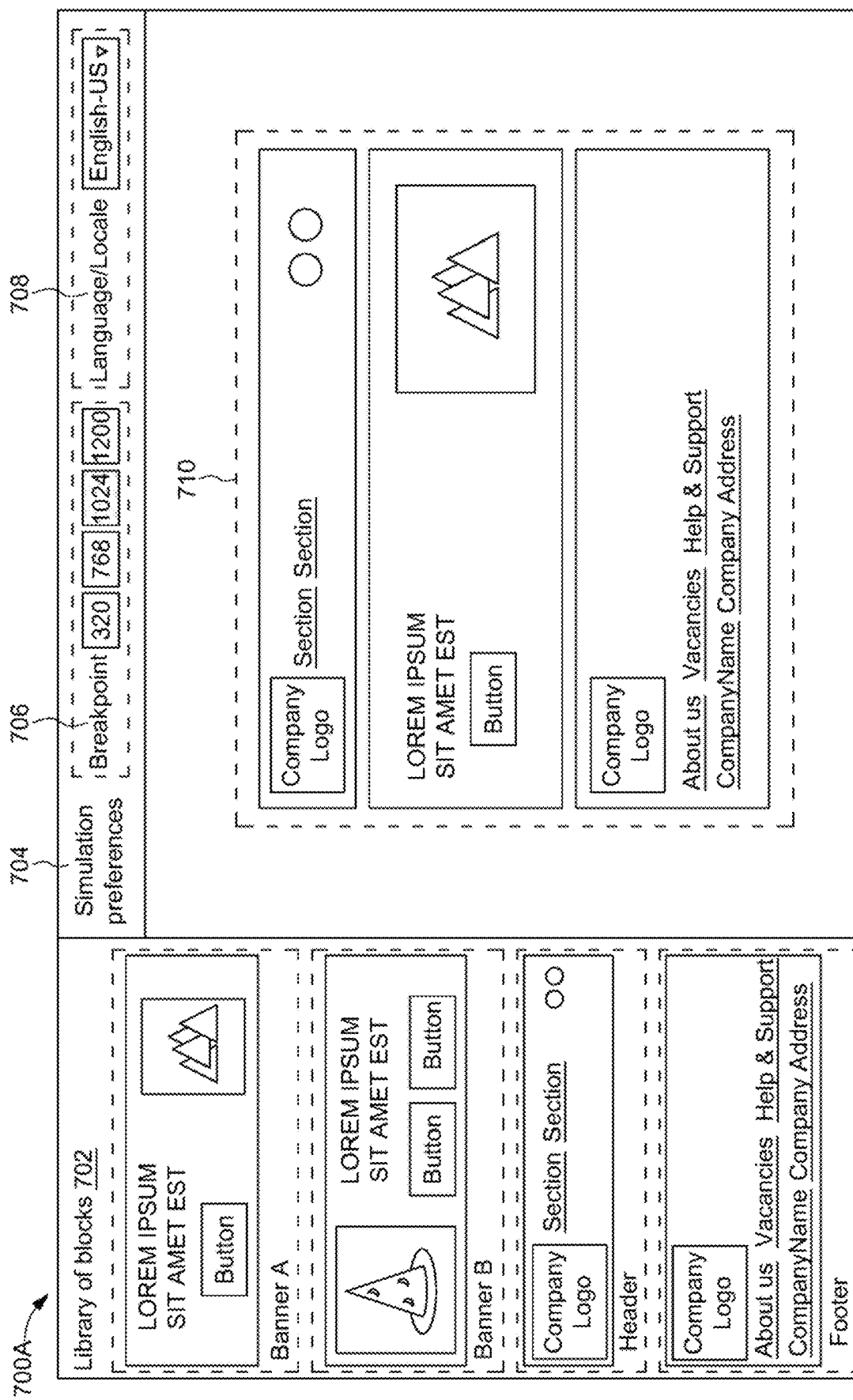
FIGS. 7A-7C illustrate exemplary contextual thumbnail previews for a project, in accordance with some embodiments of the present disclosure.
Figure 7B:
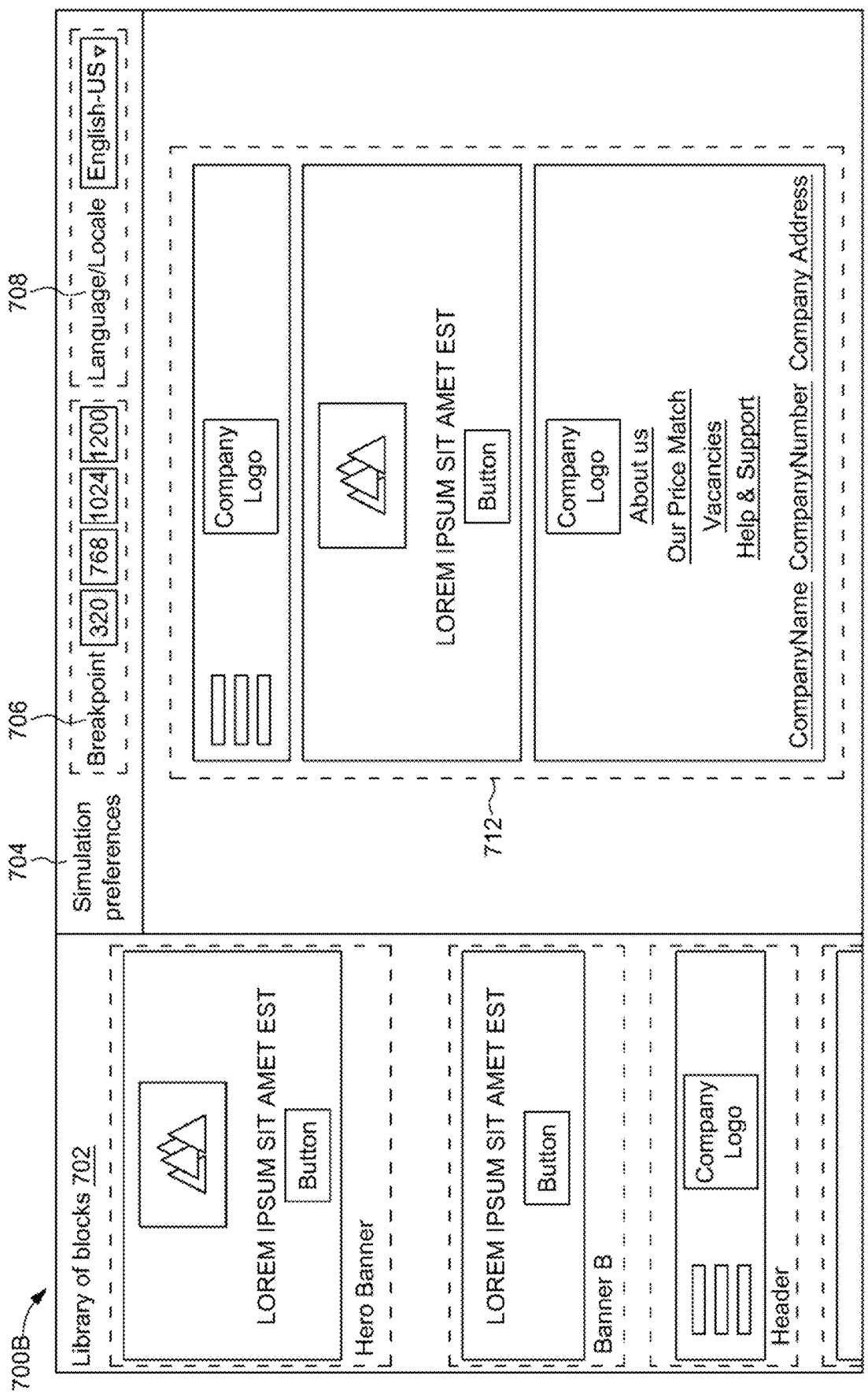
Figure 7C:
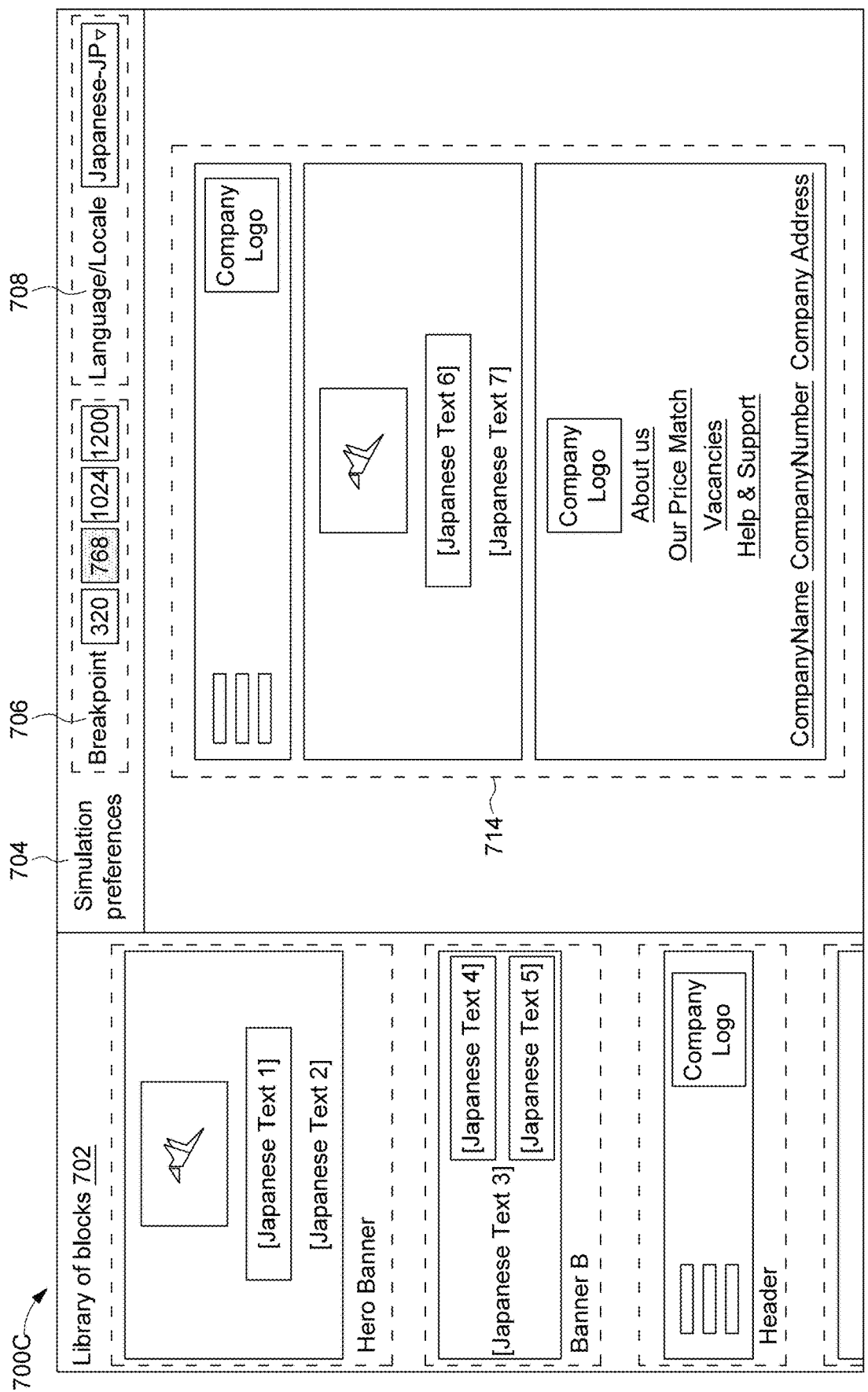

FIGS. 7A-7C illustrate exemplary contextual thumbnail previews for a project, in accordance with an exemplary embodiment of the present disclosure. FIGS. 7A-7C are explained in conjunction with FIGS. 1-6A-6C. FIG. 7A illustrates an example experience 700A served in an Integrated Development Environment (IDE). The example experience 700A may be with respect to a page or the project for first simulation preferences. A user may want to design the project using one or more components of library blocks 702 and for the first simulation preference of simulation preferences 704. The simulation preferences 704 may include breakpoint 706 and language/locale 708 that may be selected by the user to design the project. The library of blocks 702 (i.e., multiple components) may include "Banner A", "Banner B", "Header", and "Footer". It should be noted that thumbnails corresponding to each of these components may be generated, for example thumbnails for each of the "Banner A", "Banner B", "Header", and "Footer". These thumbnails may be generated based on the first simulation preferences selected by the user. Further, defined settings or the first simulation preferences selected by the user, in the example experience 700A, for the components may include simulation preferences 704 with breakpoint 706 including "1024" and with language/locale 708 including "English-US". Thus, the thumbnails for the "Banner A", "Banner B", "Header", and "Footer" may be generated for this setting or the first simulation preferences. Further, a visual preview 710 of the project which exactly corresponds to the thumbnails generated for the components of the library blocks 702, based the breakpoint 706 including "1024" and the language/locale 708 including "English-United States" may be generated and rendered to the user. The visual preview 710 includes the one or more components such as "Header", "Banner A", and "Footer". It should be noted that "Banner B" is not used in the visual preview of the project 710.

Referring now to FIG. 7B, an example experience 700B served in the IDE is illustrated. The example experience 700B may be with respect to the page or the project, for second simulation preferences. The second simulation preferences include the breakpoint 706 as "320" and the language/locale 708 as "English-United States". In the example experience 700B, a preview 712 of the project may be generated for the second simulation preferences as the simulation preferences 704 are changed by the user or different options corresponding to the breakpoint 706 and the language/locale 708 of the simulation preferences 704 are provided. For example, when the simulation preferences 706 are changed, or a new option corresponding to the breakpoint 706 and a same option corresponding to the language/locale 708 is selected by the user, the visual preview 712 may be generated. Consider a scenario, where the user may have changed the breakpoint from "1024" to "320". In such a case, pixels of each of the thumbnails corresponding each of the library of blocks 702 may be changed (i.e., pixels may be reduced as compared to pixels of the example experience 700A). As a result, the visual preview 712 may be generated. In other words, in the example experience 700B, the visual preview 712 may be generated for the one or more components, and new thumbnails may be generated for each component of the library of blocks 702, based on user selection (i.e., for the breakpoint 706 including "320" and the language/locale 708 including "English-United States").

Referring now to FIG. 7C, an example experience 700C served in the IDE is illustrated. The example experience 700C may be with respect to the page or the project for third simulation preferences. The third simulation preferences include the breakpoint 706 as "768" and the language/locale 708 as "Japanese-Japan". In the example experience 700C, a preview 714 of the project may be generated for the third simulation preferences as the simulation preferences 704 are changed by the user or different options corresponding to the breakpoint 706 and the language/locale 708 of the simulation preferences 704 are provided. For example, when the simulation preferences 706 are changed, or a new option corresponding to the breakpoint 706 and the language/locale 708 is selected by the user, the visual preview 714 may be generated. Consider a scenario, where the user may have changed the breakpoint 706 from "1024" or "320" to "768", and the locale/language 708 from "English-United States" to "Japanese-Japan". In such a case, pixels of each of the thumbnails corresponding each of the library of blocks 702 and the language may be changed. As a result, the visual preview 714 may be generated. In other words, in the example experience 700C, the visual preview 714 may be generated for the one or more components, and new thumbnails may be generated for each component of the library of blocks 702, based on user selection (i.e., for the breakpoint 706 including "768" and the language/locale 708 including "Japanese-Japan"). To avoid depicting foreign language in a drawing, FIG. 7C is shown to include placeholders indicative of Japanese text (i.e., [Japanese Text 1], [Japanese Text 2], [Japanese Text 3], [Japanese Text 4], [Japanese Text 5], [Japanese Text 6], and [Japanese Text 7]). It is appreciated that in actual implementation these sections would, instead of these placeholders, include text in the selected locale/language 708 (i.e., Japanese—Japan).

Figure 8:
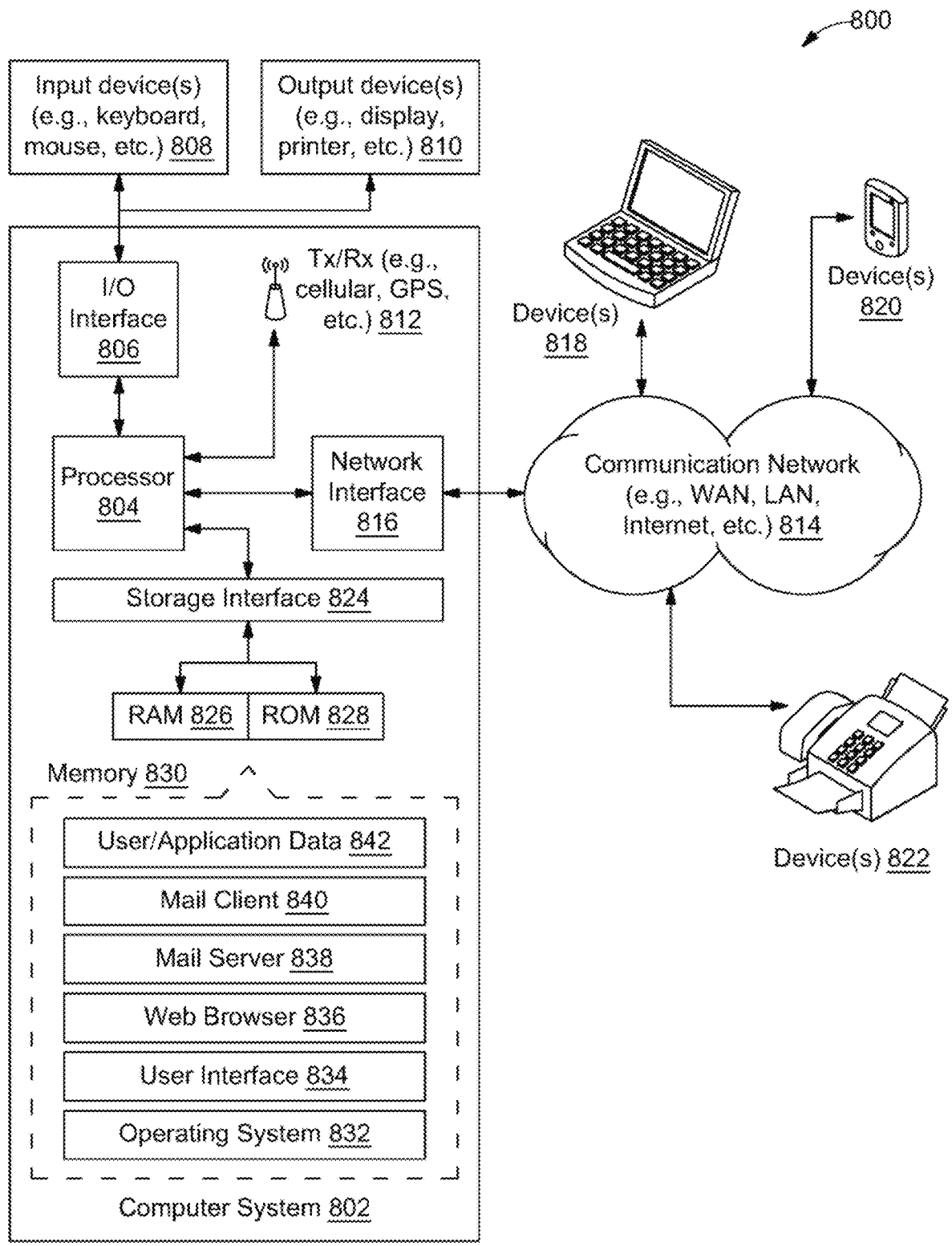
FIG. 8 illustrates a block diagram of an exemplary computer system for implementing embodiments consistent with the present disclosure.

The disclosed methods and systems may be implemented on a conventional or a general-purpose computer system, such as a personal computer (PC) or server computer. FIG. 8 is a block diagram that illustrates a system architecture 800 of a computer system 802 for determination of personality traits of agents in a contact center, in accordance with an exemplary embodiment of the present disclosure. Variations of computer system 802 may be used for implementing server for determination of personality traits of agents in a contact center. Computer system 802 may include a central processing unit ("CPU" or "processor") 804. Processor 804 may include at least one data processor for executing program components for executing user-generated or system-generated requests. A user may include a person, a person using a device such as such as those included in this disclosure, or such a device itself. The processor 804 may include specialized processing units such as integrated system (bus) controllers, memory management control units, floating point units, graphics processing units, digital signal processing units, etc. The processor 804 may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 804 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

The processor 804 may be disposed in communication with one or more input/output (I/O) devices via I/O interface 806. The I/O interface 806 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 806, the computer system 802 may communicate with one or more I/O devices. For example, an input device 808 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 810 may be a printer, fax machine, video display (e.g., cathode ray tube (CRT), liquid crystal display (LCD), light-emitting diode (LED), plasma, or the like), audio speaker, etc. In some embodiments, a transceiver 812 may be disposed in connection with the processor 804. The transceiver 812 may facilitate various types of wireless transmission or reception. For example, the transceiver 812 may include an antenna operatively connected to a transceiver chip (e.g., TEXAS INSTRUMENTS® WILINK WL1286®, BROADCOM® BCM4550IUB8®, INFINEON TECHNOLOGIES® X-GOLD 1436-PMB9800® transceiver, or the like), providing IEEE 802.11a/b/g/n, Bluetooth, FM, global positioning system (GPS), 2G/3G HSDPA/HSUPA communications, etc.

In some embodiments, the processor 804 may be disposed in communication with a communication network 814 via a network interface 816. The network interface 816 may communicate with the communication network 814. The network interface 816 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 814 may include, without limitation, a direct interconnection, local area network (LAN), wide area network (WAN), wireless network (e.g., using Wireless Application Protocol), the Internet, etc. Using the network interface 816 and the communication network 814, the computer system 802 may communicate with devices 818, 820, and 822. These devices 818, 820, and 822 may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX®, NINTENDO® DS®, SONY® PLAYSTATION®, etc.), or the like. In some embodiments, the computer system 802 may itself embody one or more of these devices.

In some embodiments, the processor 804 may be disposed in communication with one or more memory devices 830 (e.g., RAM 826, ROM 828, etc.) via a storage interface 824. The storage interface 824 may connect to memory devices 830 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPath Interconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices 830 may store a collection of program or database components, including, without limitation, an operating system 832, user interface 834, web browser 836, mail server 838, mail client 840, user/application data 842 (e.g., any data variables or data records discussed in this disclosure), etc. The operating system 832 may facilitate resource management and operation of the computer system 802. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8/10/11, etc.), APPLE® IOS®, GOOGLE® ANDROID®, BLACKBERRY® OS, or the like. User interface 834 may facilitate display, execution, interaction, manipulation, or operation of program components through textual or graphical facilities. For example, user interfaces may provide computer interaction interface elements on a display system operatively connected to the computer system 802, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 802 may implement a web browser 836 stored program component. The web browser 836 may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 802 may implement a mail server 838 stored program component. The mail server 838 may be an Internet mail server such as MICROSOFT® EXCHANGE®, or the like. The mail server 838 may utilize facilities such as ASP, ActiveX, ANSI C++/C#, MICROSOFT.NET® CGI scripts, JAVA®, JAVASCRIPT®, PERL®, PHP®, PYTHON®, WebObjects, etc. The mail server 838 may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 802 may implement a mail client 840 stored program component. The mail client 840 may be a mail viewing application, such as APPLE MAIL®, MICROSOFT ENTOURAGE®, MICROSOFT OUTLOOK®, MOZILLA THUNDERBIRD®, etc.

In some embodiments, computer system 802 may store user/application data 842, such as the data, variables, records, etc. (e.g., the set of predictive models, the plurality of clusters, set of parameters (batch size, number of epochs, learning rate, momentum, etc.), accuracy scores, competitiveness scores, ranks, associated categories, rewards, threshold scores, threshold time, and so forth) as described in this disclosure. Such databases may be implemented as fault-tolerant, relational, scalable, secure databases such as ORACLE® OR SYBASE® OR POSTGRESQL® OR any such similar data. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

The disclosure helps in generating dynamic contextual previews offering numerous benefits, including a highly realistic end-user experience by considering factors like device capabilities and language/locale settings. The disclosure enables instant on-the-fly rendering of previews based on chosen parameters (breakpoints and locales), reducing development time and iterations. The disclosure provides flexibility to visualize how components behave across various devices and locales ensuring broad compatibility and user satisfaction. The disclosure adds capability to simulate component behavior in response to context changes streamlines design and testing, promoting rapid iteration and efficient refinements. The disclosure provides user-centric approach ultimately leads to more successful and adaptable applications or projects.

Thus, the present disclosure may overcome drawbacks of traditional systems as discussed before. The present disclosure helps in generating dynamic contextual thumbnails previews, enhancing development and testing process significantly for responsive, adaptive, and hybrid experiences across multiple locales. The disclosure ensures that developers and testers can see an accurate representation of content in the specific context they are working on, as both breakpoints and locales are considered. The disclosure provides asynchronous solution that allows for efficient and quick updates, reducing wait times and increasing productivity. Moreover, use of a non-linear contextual map, which considers both adjacent and non-adjacent elements, ensures that even complex and interconnected components are previewed accurately, reflecting the intricate relationships between elements. Furthermore, the disclosure provides an ability to process both additive and subtractive changes providing a versatile solution, accommodating a wide range of design and content modifications. Also, the disclosure provides optimization for continuous evolution through scoping and assessment algorithms that helps enable streamlined processing and efficient handling of ongoing editing, making it an ideal choice for dynamic projects.

The disclosure utilizes ML models to generate temporary thumbnails based on matches, similarity, or probability scores. Thus, the disclosure helps not only to enhance accuracy but also in recognizing similar or probable cases, saving valuable development time. In short, the disclosure provides a solution for contextual preview thumbnails in no-code/low-code software that offers efficiency, accuracy, and adaptability, making it an asset for developers and testers working on responsive, adaptive, and hybrid experiences in multiple locales. Additionally, the disclosure has an ability to handle complexity, continuous evolution, and intelligent recognition of cases contributes to a more productive and precise development process.

The present disclosure may be applicable in various fields including retail, commerce, telecoms, media, insurance, automotive, financial services, travel, transportation, logistics, real estate, public & social sector, sports, energy, mining, industrial, healthcare, education, and consumer packaged goods. With regards to technology and development, the disclosure holds significant value for website development, web application development, and software development, ensuring that the end-user experience is accurately reflected across diverse contexts. Additionally, it plays a pivotal role in assisted in-store experience development, enabling real-time adjustments to enhance customer experiences. For those seeking streamlined and efficient application development, the disclosure may support self-serve low-code/no-code application development, making the process more accessible and responsive. This disclosure transcends sector boundaries and offers a versatile tool for optimizing user experiences and software development in an array of industries and applications.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method of generating contextual thumbnail previews, the method comprising:
    extracting, by a server, data associated with a project comprising at least one component, wherein the data comprises one or more breakpoints, and one or more locales defined for the at least one component of the project;
    generating, by the server, a contextual map based on the data received;
    generating, by the server, one or more interim thumbnails based on the contextual map;
    mapping, by the server, the one or more interim thumbnails with prestored thumbnails within a database through a Machine Learning (ML) model;
    determining, by the server, a similarity score for each of the one or more interim thumbnails based on the mapping;
    assigning, by the server, a category from a plurality of pre-defined categories to the each of the one or more interim thumbnails, based on the similarity score and a pre-defined tolerance, wherein the plurality of pre-defined categories comprises an identical-match category, a similar-match category, and a non-match category;
    generating, by the server, a consolidated contextual map based on the contextual map and the mapping; and
    generating, by the server, one or more final thumbnails corresponding to the contextual thumbnail previews based on the consolidated contextual map.

2. The method of claim 1, wherein the one or more interim thumbnails are stored in a temporary database and removed after generating the one or more final thumbnails.

3. The method of claim 1, wherein the contextual map and the consolidated contextual map correspond to a matrix that comprises a plurality of cells, wherein each of the plurality of cells represents a thumbnail.

4. The method of claim 3, wherein cells corresponding to thumbnails with the identical-match category, or the similar-match category are consolidated to generate the contextual thumbnail previews, and cells corresponding to thumbnails with the non-match category are retained.

5. The method of claim 1, further comprising:
    transmitting, by the server, a notification to a user, upon failure in assigning the category from the plurality of pre-defined categories;
    receiving, by the server, a feedback from the user, in response to transmitting the notification; and
    training, by the server, the ML model based on the feedback received from the user, through a feedback mechanism.

6. The method of claim 1, wherein the one or more locales are extracted from a hyper localization database, and wherein the one or more locales comprises at least one of a geography and a language.

7. The method of claim 1, further comprising:
identifying, by the server, a change in the contextual map, wherein a type of the change is at least one of a structural change, a metadata change, and a data change; and
upon a successful identification of the change, updating, by the server, the contextual thumbnail previews.

8. A system for generating contextual thumbnail previews, the system comprising:
a processing circuitry; and
a memory communicatively coupled to the processing circuitry, wherein the memory stores processor-executable instructions, which, on execution, causes the processing circuitry to:
extract data associated with a project comprising at least one component, wherein the data comprises one or more breakpoints, and one or more locales defined for the at least one component of the project;
generate a contextual map based on the data received;
generate one or more interim thumbnails based on the contextual map;
map the one or more interim thumbnails with pre-stored thumbnails within a database through a Machine Learning (ML) model;
determine a similarity score for each of the one or more interim thumbnails based on the mapping;
assign a category from a plurality of pre-defined categories to the each of the one or more interim thumbnails, based on the similarity score and a pre-defined tolerance, wherein the plurality of pre-defined categories comprises an identical-match category, a similar-match category, and a non-match category;
generate a consolidated contextual map based on the contextual map and the mapping; and
generate one or more final thumbnails corresponding to the contextual thumbnail previews based on the consolidated contextual map.

9. The system of claim 8, wherein the one or more interim thumbnails are stored in a temporary database and removed after generating the one or more final thumbnails.

10. The system of claim 8, wherein the contextual map and the consolidated contextual map corresponds to a matrix that comprises a plurality of cells, wherein each of the plurality of cells represents a thumbnail.

11. The system of claim 10, wherein cells corresponding to thumbnails with the identical-match category, or the similar-match category are consolidated to generate the contextual thumbnail previews, and cells corresponding to thumbnails with the non-match category are retained.

12. The system of claim 8, wherein the processor-executable instructions further cause the processing circuitry to:
transmit a notification to a user, upon failure in assigning the category from the plurality of pre-defined categories;
receive a feedback from the user, in response to transmitting the notification; and
train the ML model based on the feedback received from the user, through a feedback mechanism.

13. The system of claim 8, wherein the one or more locales are extracted from a hyper localization database, and wherein the one or more locales comprises at least one of a geography and a language.

14. The system of claim 8, wherein the processor-executable instructions further cause the processing circuitry to:
identify a change in the contextual map, wherein a type of the change is at least one of a structural change, a metadata change, and a data change; and
upon a successful identification of the change, update the contextual thumbnail previews.

15. A non-transitory computer-readable medium storing computer-executable instructions for generating contextual thumbnail previews, the stored computer-executable instructions, when executed by a processing circuitry, cause the processing circuitry to perform operations comprising:
extracting data associated with a project comprising at least one component, wherein the data comprises one or more breakpoints, and one or more locales defined for the at least one component of the project;
generating a contextual map based on the data received;
generating one or more interim thumbnails based on the contextual map;
mapping the one or more interim thumbnails with pre-stored thumbnails within a database through a Machine Learning (ML) model;
determining a similarity score for each of the one or more interim thumbnails based on the mapping;
assigning a category from a plurality of pre-defined categories to the each of the one or more interim thumbnails, based on the similarity score and a pre-defined tolerance, wherein the plurality of pre-defined categories comprises an identical-match category, a similar-match category, and a non-match category;
generating a consolidated contextual map based on the contextual map and the mapping; and
generating one or more final thumbnails corresponding to the contextual thumbnail previews based on the consolidated contextual map.

* * * * *